United States Patent
Ohkawa

(10) Patent No.: US 10,884,688 B2
(45) Date of Patent: Jan. 5, 2021

(54) PRINT CONTROL DEVICE FOR EXCLUSION OF PRINT DATA INCLUDED IN SEQUENTIAL PRINTING AND COMPUTER READABLE MEDIUM FOR THE SAME

(71) Applicant: FUJI XEROX CO., LTD., Tokyo (JP)

(72) Inventor: Kazuhiro Ohkawa, Yokohama (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 16/532,845

(22) Filed: Aug. 6, 2019

(65) Prior Publication Data
US 2020/0257483 A1    Aug. 13, 2020

(30) Foreign Application Priority Data
Feb. 8, 2019    (JP) .................................. 2019-021994

(51) Int. Cl.
*G06F 3/12* (2006.01)

(52) U.S. Cl.
CPC ............ *G06F 3/1274* (2013.01); *G06F 3/126* (2013.01); *G06F 3/1281* (2013.01); *G06F 3/1296* (2013.01)

(58) Field of Classification Search
None
See application file for complete search history.

(56) References Cited

U.S. PATENT DOCUMENTS

2019/0258434 A1*  8/2019  Shiraishi ............... G06F 3/1284

FOREIGN PATENT DOCUMENTS

JP        2013-252675        12/2013

OTHER PUBLICATIONS

English language abstract and machine translation of JP2013-252675.

* cited by examiner

*Primary Examiner* — Lennin R Rodriguezgonzalez
(74) *Attorney, Agent, or Firm* — Fildes & Outland, P.C.

(57) ABSTRACT

A print control device includes: an extraction section that extracts plural print data items to be included in a print unit, the print unit being a unit of sequential printing by a printing device; an exclusion section that excludes a specific print data item among the plural print data items extracted by the extraction section, from the print unit; and a control section that performs control such that the print unit from which the specific print data item is excluded by the exclusion section is printed by the printing device.

15 Claims, 14 Drawing Sheets

FIG. 6

| ORDER ACCEPTANCE ID | ORDER ACCEPTANCE DATE AND TIME | ORDER ACCEPTANCE STATUS | SHIPPING SCHEDULED DATE AND TIME | ... |
|---|---|---|---|---|
| 10000 | 2018/1/9 0:00 | PENDING | 2018/11/30 0:00 | ... |
| ... | ... | ... | ... | ... |

FIG. 7

| PRODUCT ID | PRODUCT NAME | NUMBER | PRODUCT STATUS | POST-PROCESSING START SCHEDULED DATE AND TIME | ... |
|---|---|---|---|---|---|
| 10000-1 | XY CLUB | 1 | PENDING | | ... |
| ... | ... | ... | ... | ... | ... |

FIG. 8

| PART ID | PART NAME | NUMBER OF PAGES | NUMBER | PART STATUS | PRINT START SCHEDULED DATE AND TIME | PRINTER NAME | ... |
|---|---|---|---|---|---|---|---|
| 10000-1-1 | COVER | 2 | 1 | PENDING | | B-5 | |
| 10000-1-3 | MAIN PART | 290 | 1 | DRAFT SUBMISSION COMPLETED | | A-1 | |
| ... | ... | ... | ... | ... | ... | ... | |

FIG. 9

| ORDER ACCEPTANCE (ALL): 20 ITEMS | | | | |
|---|---|---|---|---|
| DETAIL | PENDING | PENDING CANCELLATION | SCHEDULING | EXPAND ALL | CLOSE ALL |

| ORDER ACCEPTANCE ID | ORDER ACCEPTANCE DATE AND TIME | PRODUCT NAME | ORDER ACCEPTANCE STATUS | SHIPPING SCHEDULED DATE AND TIME |
|---|---|---|---|---|
| 10000 | 2018/1/9 0:00 | XY CLUB | PENDING | 2018/11/30 0:00 |

| PRODUCT BRANCH NUMBER | PART BRANCH NUMBER | PART NAME | NUMBER OF PAGES | NUMBER | PRODUCT STATUS | POST-PROCESSING START SCHEDULED DATE AND TIME |
|---|---|---|---|---|---|---|
| 1 | | | | | PENDING | |

| | PART BRANCH NUMBER | PART NAME | NUMBER | PART STATUS | PRINT START SCHEDULED DATE AND TIME | PRINTER NAME |
|---|---|---|---|---|---|---|
| | 1 | COVER | 1 | PENDING | | B-5 |
| | 3 | MAIN PART | 290 | 1 | DRAFT SUBMISSION COMPLETED | A-1 |

301, 302 (PENDING), 303 (PENDING CANCELLATION)

*FIG. 10*

ORDER ACCEPTANCE (ALL): 20 ITEMS

[DETAIL] [PENDING]  [PENDING CANCELLATION]  [SCHEDULING]  [EXPAND ALL] [CLOSE ALL] — 301

302 → PENDING
303 → PENDING CANCELLATION

| ORDER ACCEPTANCE ID | ORDER ACCEPTANCE DATE AND TIME | ORDER ACCEPTANCE STATUS | SHIPPING SCHEDULED DATE AND TIME |
|---|---|---|---|
| 10000 | 2018/1/9 0:00 | PENDING | 2018/11/30 0:00 |

| PRODUCT BRANCH NUMBER | PRODUCT NAME | NUMBER | PRODUCT STATUS | POST-PROCESSING START SCHEDULED DATE AND TIME |
|---|---|---|---|---|
| 1 | XY CLUB | 1 | PENDING | |

| PART BRANCH NUMBER | PART NAME | NUMBER OF PAGES | NUMBER | PART STATUS | PRINT START SCHEDULED DATE AND TIME | PRINTER NAME |
|---|---|---|---|---|---|---|
| 1 | COVER | 2 | 1 | PENDING | | B-5 |
| 3 | MAIN PART | 290 | 1 | PENDING | | A-1 |
| ... | | | | | | |

FIG. 14

| PART ID | PART NAME | NUMBER OF PAGES | NUMBER | PART STATUS | PENDING CANCELLATION DATE AND TIME | PRINT START SCHEDULED DATE AND TIME | PRINTER NAME | ... |
|---|---|---|---|---|---|---|---|---|
| 10000-1-1 | COVER | 2 | 1 | PENDING | 2018/11/27 00:00 | | B-5 | |
| 10000-1-3 | MAIN PART | 290 | 1 | DRAFT SUBMISSION COMPLETED | | | A-1 | |
| ... | ... | ... | ... | ... | | ... | ... | |

PRINT CONTROL DEVICE FOR EXCLUSION OF PRINT DATA INCLUDED IN SEQUENTIAL PRINTING AND COMPUTER READABLE MEDIUM FOR THE SAME

CROSS-REFERENCE TO RELATED APPLICATIONS

This application is based on and claims priority under 35 USC 119 from Japanese Patent Application No. 2019-021994 filed on Feb. 8, 2019.

BACKGROUND

Technical Field

The present invention relates to a print control device and a computer readable medium.

Related Art

A print system adapted such that a printing device acquires information regarding a requested print material such as paper, which is necessary to execute print data, from the print data, acquires information regarding a deadline, compares information regarding owned print materials such as papers prepared in the printing device with the information regarding the requested print material to determine whether or not it is possible to perform printing, holds the print data as a pending job data in a case where it is determined to be impossible to perform printing, and registers the pending job data in a print queue if it is determined that the deadline of the pending job data has become less than a deadline remaining time is known (see JP-A-2013-252675, for example).

SUMMARY

There may be a case in which plural print data items are scheduled to be included in a print unit that is a unit of sequential printing by a printing device. In such a case, even if it is desired not to print a part of the plural print data items that are to be included in the print unit by the printing device, it is only possible to perform printing such that the entire print unit is not printed by the printing device.

Aspect of non-limiting embodiments of the present disclosure relates to set a print unit by excluding a specific print data item from plural print data items to be included in the print unit that is a unit of sequential printing by a printing device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a print control device including: an extraction section that extracts plural print data items to be included in a print unit, the print unit being a unit of sequential printing by a printing device; an exclusion section that excludes a specific print data item among the plural print data items extracted by the extraction section, from the print unit; and a control section that performs control such that the print unit from which the specific print data item is excluded by the exclusion section is printed by the printing device.

BRIEF DESCRIPTION OF DRAWINGS

Exemplary embodiment(s) of the present invention will be described in detail based on the following figures, wherein:

FIG. 6 is a diagram illustrating an example of order acceptance data written in an order database according to the first exemplary embodiment of the invention;

FIG. 7 is a diagram illustrating an example of product data written in the order database according to the first exemplary embodiment of the invention;

FIG. 8 is a diagram illustrating an example of part data written in the order database according to the first exemplary embodiment of the invention;

FIG. 9 is a diagram illustrating an example of an order management screen on which a user performs an operation of designating a part and changing a status from "draft submission completed" to "pending" according to the first exemplary embodiment of the invention;

FIG. 10 is a diagram illustrating an example of the order management screen after the status of the part designated by the user is changed from "draft submission completed" to "pending" according to the first exemplary embodiment of the invention;

FIG. 14 is a diagram illustrating an example of part data written in an order database according to the third exemplary embodiment of the invention.

DETAILED DESCRIPTION

Figure 1:
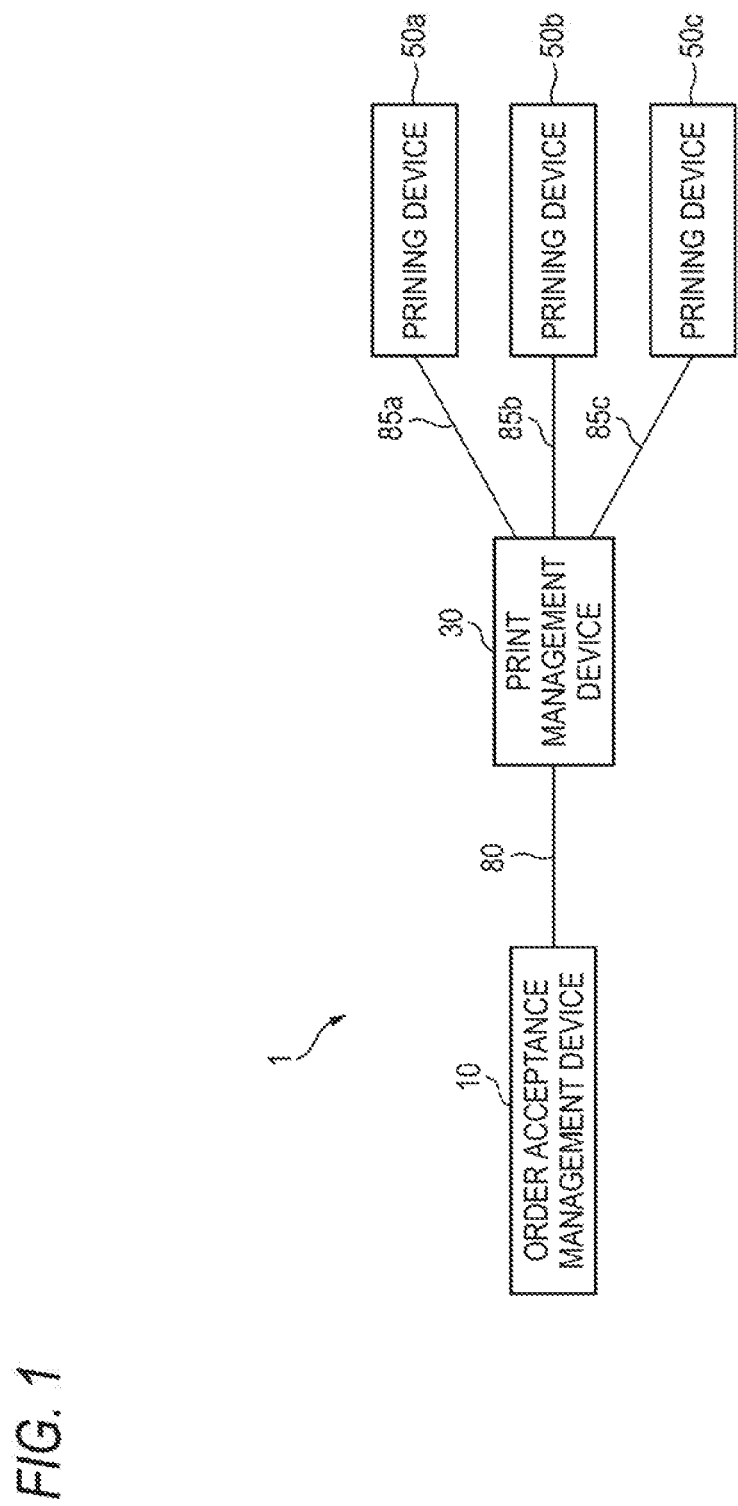
FIG. 1 is a diagram illustrating an overall configuration example of a print management system according to an exemplary embodiment of the invention.

Hereinafter, exemplary embodiments of the invention will be described in detail with reference to accompanying drawings.

Exemplary embodiments will provide a print management device adapted to perform control such that plural print data items that are scheduled to be included in a print unit that is a unit of sequential printing of a printing device is specified, specific print data is excluded from the plural print data items, and a print unit after the specific print data is excluded is printed by the printing device.

Hereinafter, a case in which an order acceptance management device manages order acceptance of a product including plural parts and a print management device manages printing or post-processing in accordance with the order acceptance will be described as an example. Here, the "product" means a unit of an order acceptance, such as a book or a magazine, and the "part" is created through printing of a cover, a main part, and the like that are included in the product in most cases. Although any of the product and the part may be exemplified as print data, the following description will be given by exemplifying a part.

Incidentally, such parts may be required to be printed on the same type of paper, for example, depending on the type thereof. It is desirable to sequentially print such parts to be printed on the same type of paper by the same printing device. This is because it takes time and effort to replace sequential paper in a case of a printing device using sequential paper, for example, in particular, and it is thus efficient to use up one sequential paper for printing the same type of part. This is because it also takes time and effort to replace cut paper in a case in which the printing device uses the cut device, it is efficient to use up all the cut paper that can be accommodated at once for printing the same type of part. Therefore, it is preferable to include parts to be printed on the same type of paper in the same print unit. Hereinafter, including parts in the same print unit will be referred to as "grouping". Note that including parts in the same print unit also leads to scheduling in the print unit, and description will be given here by exemplifying grouping.

As methods in which a print management device specifies print data, a method in which the print management device actually acquires print data and a method in which a device other than the print management device saves print data and the print management device acquires management data of the print data including a location where the print data is saved are conceivable, and the latter method will be described below as an example.

Further, excluding specific print data from plural print data items will be referred to as "pending" in the following description. In a case in which printing or post-processing is performed for an order with a long time until deadline in an early stage, problems such as a problem that management and storage after the printing or the post-processing are needed, a problem that there is a probability that it is necessary to perform printing again due to changes in requirements after the printing or the post-processing, and a problem that resources (paper and the like, for example) necessary for the printing or the processing are not ready may occur, and there may thus be a case in which it is not desired to perform grouping immediately. Thus, "pending" is chosen for such an order. Meanwhile, a state in which specific print data has become a target of grouping without being excluded from plural print data items will be referred to as "draft submission completed".

Overall Configuration of Print Management System

FIG. 1 is a diagram illustrating an overall configuration of a print management system 1 according to an exemplary embodiment. As illustrated in the drawing, the print management system 1 is configured such that an order acceptance management device 10 and a print management device 30 are connected via a communication line 80 and the print management device 30 and printing devices 50a to 50c are connected via communication lines 85a to 85c, respectively. Note that although the drawing illustrates the printing devices 50a to 50c and the communication lines 85a to 85c, these components may be referred to as a printing device 50 and a communication line 85 when these are not distinguished. Two or more order acceptance management devices 10 and two or more print management devices 30 may be present regardless of the illustration in which only one order acceptance management device 10 and only one print management device 30 are provided, and also, two or less printing devices 50 or four or more printing devices may be present regardless of the illustration in which three printing devices 50 are provided.

The order acceptance management device 10 is a computer device that is used by a user for managing order acceptance of products from customers. The order acceptance management device 10 holds instruction data for providing instructions for management such as printing in accordance with order acceptance to the print management device 30. The instruction data includes a description related to order acceptance (hereinafter, referred to as an "order acceptance description"), a description for managing products (hereinafter, also referred to as a "product description"), and a description related to parts (hereinafter, referred to as a "part description"). Here, the instruction data is described in an extensible markup language (XML), for example. In such a case, the order acceptance description may be included in a first layer, the product description may be included in a second layer, and the part description may be included in a third layer. Also, the order acceptance management device 10 sets which of printing devices 50 the part included in the product of the order acceptance is to be printed, which of "pending" and "draft submission completed" the status of the part is to be set when the print management device 30 receives the instruction data, and the like in the order acceptance description in response to a user's operation. Note that the order acceptance management device 10 may be realized by a general-purpose personal computer, for example.

The print management device 30 is a computer device that receives the instruction data from the order acceptance management device 10 and manages creation of products including printing of parts on the basis of the order acceptance description, the product description, and the part description included in the instruction data. Note that the print management device 30 may be realized by a general-purpose personal computer, for example.

The printing device 50 is a device that prints an image on a recording medium such as paper. The printing device 50 may be a device that reads an image from a recording medium such as paper, transmits and receives images via the communication line 85, and the like in addition to the printing of the image. The printing device 50 is a printer from the viewpoint of performing only image printing, is a scanner from the viewpoint of performing only image reading, is a copy machine from the viewpoint of reading and printing images, and is a facsimile from the viewpoint of reading, transmitting, or receiving and printing images. Hereinafter, a device that prints, reads, transmits, and receives images will be described as an example of the printing device 50. Note that the printing device 50 may use sequential paper or cut paper as the recording medium.

Figure 2:
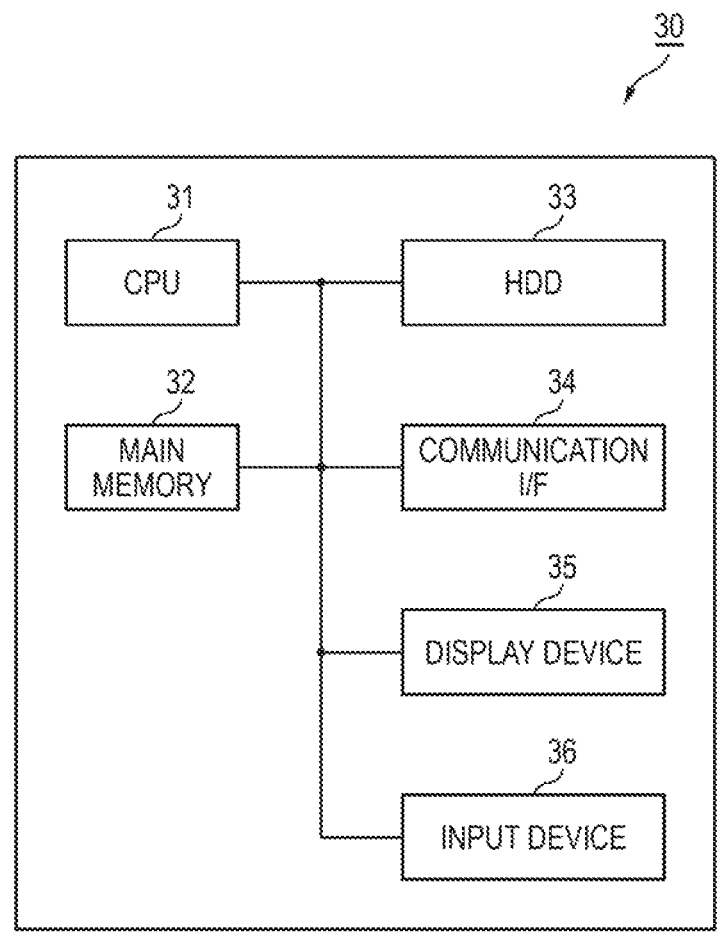
FIG. 2 is a diagram illustrating a hardware configuration example of the print management system according to the exemplary embodiment of the invention.

Hardware Configurations of Print Management Device and Order Acceptance Management Device FIG. 2 is a diagram illustrating a hardware configuration example of the print management device 30 according to the exemplary embodiment. As illustrated in the drawing, the print management device 30 includes a CPU 31 that is an arithmetic operation section and a main memory 32 and a hard disk drive (HDD) 33 that are storage sections. Here, the CPU 31 executes various kinds of software such as an operating system (OS) and applications, thereby realizing various functions, which will be described later. The main memory 32 is a storage region for storing various kinds of software and data and the like for executing the software, and the HDD 33 is a storage region for storing data input to the various kinds of software, data output from the various kinds of software, and the like. Further, the print management device 30 includes a communication I/F 34 for communicating with the outside, a display device 35 such as a display, and an input device 36 such as a keyboard and a mouse.

The hardware configuration illustrated in FIG. 2 is also regarded as a hardware configuration of the order acceptance management device 10. However, it is assumed that the CPU 31, the main memory 32, the HDD 33, the communication I/F 34, the display device 35, and the input device 36 in FIG. 2 are described as a CPU 11, a main memory 12, an HDD 13, a communication I/F 14, a display device 15, and an input device 16, respectively, when description is given in regard to the order acceptance management device 10.

Hardware Configuration of Printing Device

Figure 3:
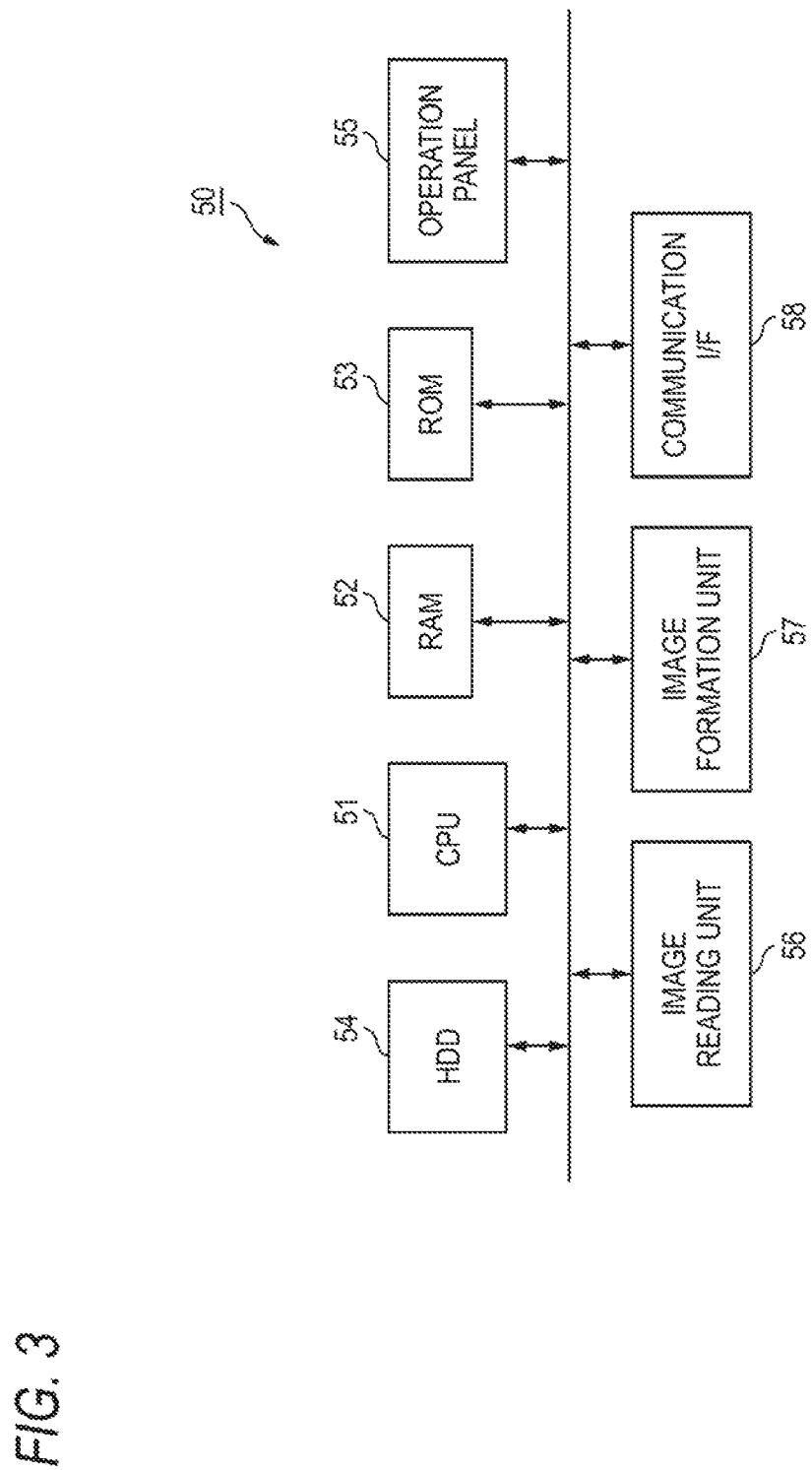
FIG. 3 is a diagram illustrating a hardware configuration example of a printing device according to the exemplary embodiment of the invention.

FIG. 3 is a diagram illustrating a hardware configuration example of the printing device 50 according to the exemplary embodiment. As illustrated in the drawing, the printing device 50 includes a central processing unit (CPU) 51, a random access memory (RAM) 52, a read only memory (ROM) 53, a hard disk drive (HDD) 54, an operation panel 55, an image reading unit 56, an image formation unit 57, and a communication interface (hereinafter, referred to as a "communication I/F") 58.

The CPU 51 realizes various functions, which will be described later, by loading various programs stored in the ROM 53 or the like to the RAM 52 and executing the programs.

The RAM 52 is a memory used as a working memory or the like for the CPU 51. The ROM 53 is a memory that stores the various programs and the like executed by the CPU 51. The HDD 54 is, for example, a magnetic disk that stores image data read by the image reading unit 56, image data used for forming an image by the image formation unit 57, and the like.

The operation panel 55 is, for example, a touch panel that displays various kinds of information and receives operations input from the user. Here, the operation panel 55 includes a display on which various kinds of information is displayed and a position detecting sheet for detecting a position designated by a designating section such as a finger or a stylus pen. Alternatively, a display and a keyboard may be used instead of the touch panel.

The image reading unit 56 reads images recorded on a recording medium such as paper. Here, the image reading unit 56 is, for example, a scanner, and a CCD-scheme scanner adapted such that reflected light of light emitted from a light source to an original document is reduced with a lens and is received by charge coupled devices (CCD) or a CIS-scheme scanner adapted such that reflected light of light emitted in order from an LED light source to an original document is received by a contact image sensor (CIS) may be used.

The image formation unit 57 forms images on a recording medium such as paper. Here, the image formation unit 57 is, for example, a printer, and an electrophotographic-scheme printer adapted such that a loner adhering to a photoconductor is transferred to a recording medium to form an image or an inkjet-scheme printer adapted such that ink is ejected onto a recording medium to form an image may be used.

The communication I/F 58 transmits and receives various kinds of information to and from other devices, such as a print management device 30, for example, via the communication line 85.

First Exemplary Embodiment

Functional Configuration of Print Management Device

Figure 4:
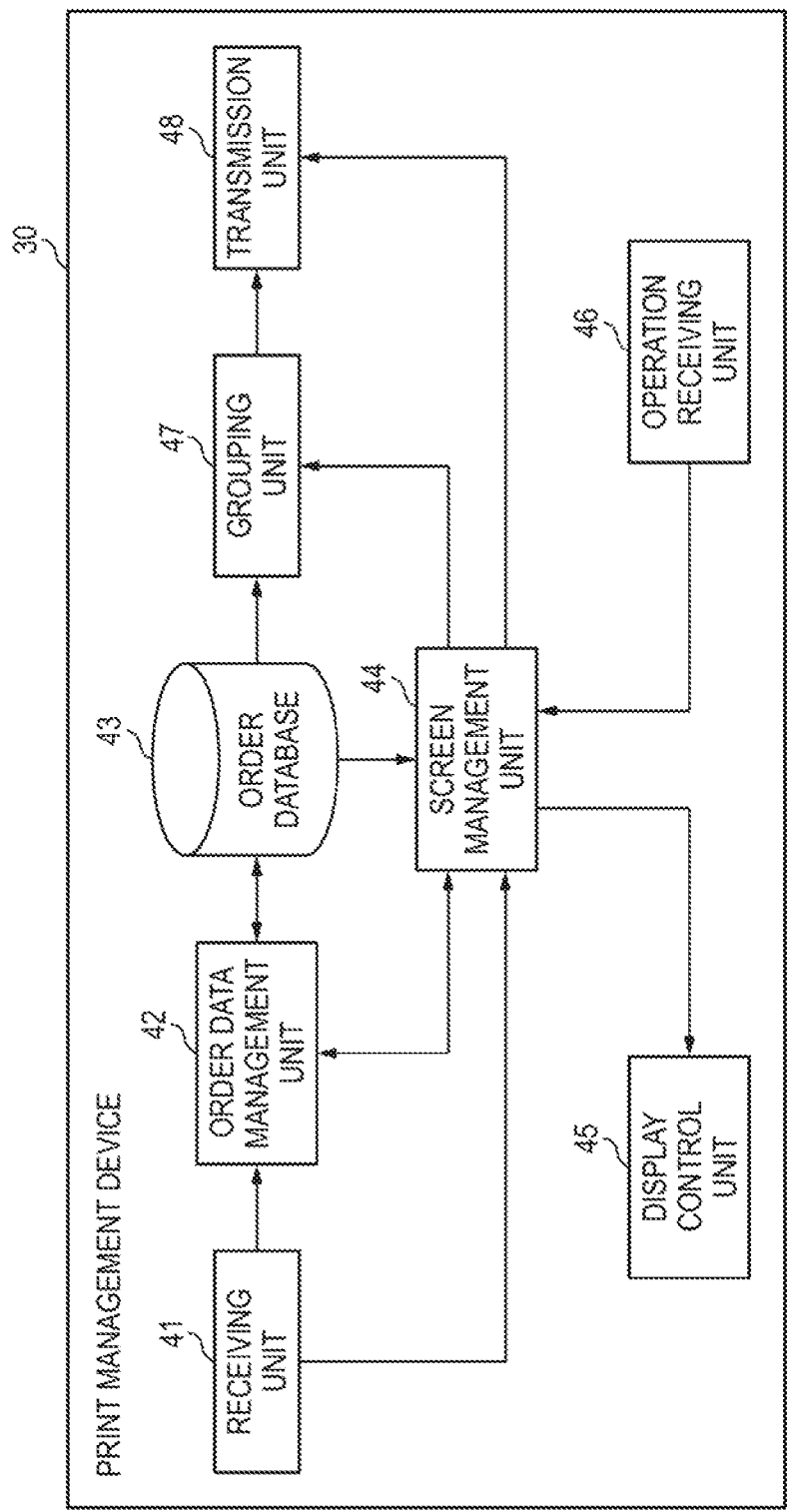
FIG. 4 is a block diagram illustrating a functional configuration example of a print management device according to a first exemplary embodiment of the invention.

FIG. 4 is a block diagram illustrating a functional configuration example of the print management device 30 according to a first exemplary embodiment. As illustrated in the drawing, the print management device 30 according to the first exemplary embodiment includes a receiving unit 41, an order data management unit 42, an order database 43, a screen management unit 44, a display control unit 45, an operation receiving unit 46, a grouping unit 47, and a transmission unit 48.

The receiving unit 41 receives instruction data from the order acceptance management device 10. The instruction data includes an order acceptance description, a product description, and a part description as described above. In particular, parts described in the part description is scheduled to be grouped for each group of sequential printing of the printing device 50 and are targets to be included in a print unit. Note that the "targets to be included in a print unit" means a part description grouped unless they are pending. In the exemplary embodiment, the receiving unit 41 is provided as an example of the extraction section that extracts plural print data items to be included in a print unit that is a unit of sequential printing of the printing device. Also, the part description in the instruction data is used as an example of the management data for managing specific print data, and the reception unit 41 is provided as an example of the acquisition section that acquires the management data.

The order data management unit 42 acquires the instruction data from the reception unit 41 and stores order data in the order database 43. Specifically, the order data management unit 42 picks up the order acceptance description from the instruction data and stores the order acceptance data in the order database 43, picks up the product description from the instruction data and stores the product data in the order database 43, and picks up the part description from the instruction data and stores the part data in the order database 43.

At this time, the order data management unit 42 sets a part status in the part data to either "draft submission completed" or "pending". Here, an item indicating which of "draft submission completed" and "pending" the part status is to be set to, may be necessarily designated in the part description in the instruction data. For example, a pending flag may be provided in the part description in the instruction data, the part status may be set to "pending" if the pending flag is "ON", or the part status may be set to "draft submission completed" if the pending flag is "OFF". Alternatively, an item indicating which of "draft submission completed" or "pending" the part status is to be set to may be arbitrarily designated in the part description in the instruction data, and in a case in which there is no designation, the print management device 30 may hold the item in system setting related to pending. In a case in which no pending flag is provided in the part description in the instruction data, for example, the part status may be set to "pending" if the system setting related to pending is "ON", and the part status may be set to "draft submission completed" if the system setting related to pending is "OFF".

In the exemplary embodiment, the order data management unit 42 is provided as an example of the exclusion section that excludes specific print data from plural print data items. Also, a pending flag is used as an example of exclusion availability information indicating whether or not the specific print data included in the management data is to be excluded, and the order data management unit 42 is provided as an example of the exclusion section that decides whether or not the specific print data is to be excluded from the plural print data items on the basis of the exclusion availability information. Further, the pending flan "ON" is used as an example of indication that the specific print data indicated by the exclusion availability information is to be excluded, and the system setting "ON" related to pending is used as an example of indication that the specific data stored in the device itself is to be excluded. Also, a mode in which the specific print data is excluded by setting an output destination of the specific print data in a specific printer is also conceivable as an example of the exclusion available information. The specific printer is, for example, a theoretical printer, and the print data set to be output by the theoretical printer sets the theoretical printer as an output destination, sets the state as "pending", and is not regarded as a target of grouping.

Also, in a case in which the user performs an operation of changing the status from "draft submission completed" to "pending" while designating a specific part, the order data management unit 42 changes the part status in the part data to "pending" in response to the operation. However, in a case in which a predetermined condition is satisfied, the order data management unit 42 may refuse to change the part status "draft submission completed" to "pending" even if the user performs the operation of charming the status from "draft submission completed" to "pending". In a case in which inhibition of pending is set in advance, or in a case in which a period obtained by subtracting a current date and time from a shipping scheduled date and time of the product has become less than a grace period, for example, the order data management unit 42 may refuse to change the part status in the part data to "pending".

In the exemplary embodiment, the operation of changing the status from "draft submission completed" to "pending" while designating the specific part is used as an example of the operation of excluding the specific print data. Also, the period obtained by subtracting the current date and time from the shipping scheduled date and time of the product is used as an example of the period until the processing deadline of the specific print data, the grace period is used as an example of the predetermined period, and the order data management unit 42 is provided as an example of the exclusion section that does not exclude the specific print data from the plurality of print data items if the period until the processing deadline of the specific print data has become less than the predetermined period.

Further, the order data management unit 42 changes the part status in the part data to "draft submission completed" as pre-processing of grouping after the part status in the part data becomes "pending". Specifically, in a case in which a predetermined condition is satisfied, the part status in the part data may be changed from "pending" to "draft submission completed". Here, a condition that a period obtained by subtracting a current date and time from a shipping scheduled date and time of the product has become less than a grace period is conceivable as the predetermined condition. Also, a condition that the user has performed an operation of changing the status from "pending" to "draft submission completed" while designating a specific part is conceivable.

In the exemplary embodiment, the order data management unit 42 is provided as an example of the exclusion section that cancels exclusion of specific print data form plural print data items in a case in which the predetermined condition is satisfied. The period obtained by subtracting the current date and time from the shipping scheduled date and time of the product is used as an example of the period until the processing deadline of the specific print data, and the grace period is used as an example of the predetermined period. Further, the user's operation of changing the status from "pending" to "draft submission completed" while designating the specific part is used as an example of the operation of cancelling the exclusion of the specific data.

The order database 43 is a database that stores order data. Specifically, the order database 43 stores order acceptance data, product data, and part data.

The screen management unit 44 manages the order management screen for managing order data stored in the order database 43. Specifically, the order management screen for managing the order acceptance data, the product data, and the part data is created, and a position at which the operation received by the operation receiving unit 46 is performed is specified on this order management screen.

The display control unit 45 performs control such that the order management screen created by the screen management unit 44 is displayed on the display device 35 (see FIG. 2). In particular, the display control unit 45 performs control such that the order management screen is displayed on the display device 35 in a state in which whether or not each part may be brought into a pending state is explicitly indicated for each part. In the exemplary embodiment, the display control unit 45 is provided as an example of the display section that displays information regarding first print data and in formation regarding second print data in a distinguished manner in a case in which the first print data is excluded from plural print data items and the second print data is not excluded therefrom. Note that display modes of the first print data and the second print data may be differentiated such that the operator may easily identify the first print data and the second print data. In a case in which the display modes are differentiated, "pending" and "draft submission completed" may be displayed using letters, and further, changes such as using different character attributes (for example, fonts, colors, thicknesses, and underlines), surrounding of the entire rows where attributes of parts are displayed with frames, hatching, and the like may be made.

The operation receiving unit 46 receives a user's operation on the order management screen displayed on the display device 35 (see FIG. 2).

The grouping unit 47 performs grouping on parts with part statuses "draft submission completed" in the part data included in the order data that is stored in the order database 43 as targets.

The transmission unit 48 transmits the grouped part data to the printing device 50 such that the parts grouped by the grouping unit 47 are printed by the printing device 50. In the exemplary embodiment, the transmission unit 48 is provided as an example of the control section that performs control such that the print unit after the specific print data is excluded is printed by the printing device.

Operations of Print Management Device 30

In the print management device 30, the receiving unit 41 first receives instruction data from the order acceptance management device 10 and outputs the instruction data to the order data management unit 42.

Then, the order data management unit 42 acquires the instruction data from the receiving unit 41.

Figure 5:
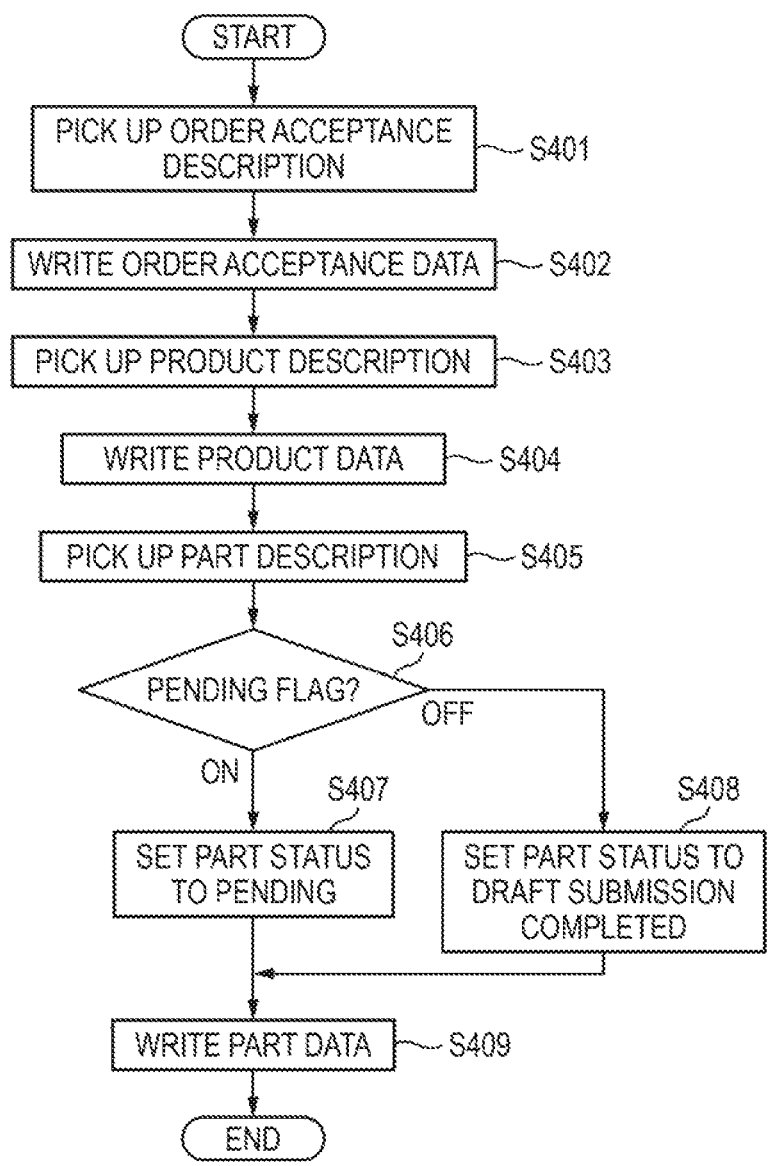
FIG. 5 is a flowchart illustrating an operation example of an order data management unit after instruction data is acquired according to the first exemplary embodiment of the invention.

FIG. 5 is a flowchart illustrating an operation example of the order data management unit 42 thereafter. Note that although FIG. 5 illustrates processing related to one order acceptance description in the instruction data, the processing is repeated for all order acceptance descriptions in the order data in practice. Also, description will be given on the assumption that a pending flag is provided in a part description in the instruction data.

First, the order data management unit 42 picks up an order acceptance description from the instruction data (Step 401). Then, the order data management unit 42 writes order acceptance data created on the basis of the order acceptance description in the order database 43 (Step 402).

Then, the order data management unit 42 picks up a product description associated with the order acceptance description picked up in Step 401 from the instruction data (Step 403). In A case in which the instruction data includes an order acceptance description in a first layer, includes a product description in a second layer, and includes a part description in a third layer, for example, the product description in the layer just below that of the order acceptance description picked up in Step 401 may be picked up as the product description associated with the order acceptance description. If there are plural product descriptions, all of them may be picked up. Then, product data created on the basis of the product description is written in the order database 43 (Step 404).

Then, the order data management unit 42 picks up the part description associated with the product description picked up in Step 403 from the instruction data (Step 405). In a case in which the instruction data includes the order acceptance description in the first layer, includes the product description in the second layer, and includes the part description in the third layer, for example, the part description in the layer just below that of the product description picked up in Step 403 may be picked up as the part description associated with the product description. If there are plural part descriptions, all of them may be picked up.

In this manner, the order data management, unit 42 determines a value of the pending flag included in the part description (Step 406). If it is determined that the pending flag is "ON", the order data management unit 42 sets the part status to "pending" in the part data created on the basis of the part description (Step 407). If it is determined that the pending flag is "OFF", the order data management unit 42 sets the part status to "draft submission completed" in the part data created on the basis of die part description (Step 408).

Thereafter, the order data management unit 42 writes the part data with the part status set to either "pending" or "draft submission completed" in this manner in the order database 43 (Step 409).

Next, various kinds of data written in the order database 43 through the operations illustrated in FIG. 5 will be described.

FIG. 6 is a diagram illustrating an example of an order acceptance data written in the order database 43. As illustrated in the drawing, the order acceptance data associates an order acceptance ID, an order acceptance date and time, an order acceptance status, a shipping scheduled date and time, and the like. Here, the order acceptance ID is identification information for uniquely identifying order acceptance. The order acceptance date and time is a date and time when an order is received. The order acceptance status is a current state of the order acceptance. The order acceptance status is set to "pending if any of product statuses in product data associated with order acceptance data is set to "pending", and the order acceptance status is set to "draft submission completed" if all the product statuses in the product data associated with the order acceptance data are set to "draft submission completed". Therefore, in FIG. 5, the order acceptance status may not be set in Step 402, the order acceptance status is then set to "pending" at a timing at which any of the product statuses in the product data associated with the order acceptance data may be set to "pending, and the order acceptance status may be set to "draft submission completed" at a timing at which all the product statuses in the product data associated with the order acceptance data are set to "draft submission completed". The shipping scheduled date and time is a date and time when the products of the order acceptance are scheduled to be shipped.

FIG. 7 is a diagram illustrating an example of product data written in the order database 43. As illustrated in the drawing, the product data associates a product ID, a product name, the number, a product status, a post-processing start scheduled date and time, and the like. Here, the product ID is identification information for uniquely identifying the products of the order acceptance. The order acceptance data is associated with the product data by producing the product ID as a combination of the order acceptance ID of the order acceptance corresponding to the product with a product branch number. However, the order acceptance data may be associated with the product data by providing an item indicating a link to the product data in the order acceptance data and providing an item indicating a link to the order acceptance data in the product data. The product name is a name of a product of the order acceptance. The number of parts are the number of products of the order acceptance. The product status is a current state of the product of the order acceptance. The product status is set to "pending" if any of part statuses in the part data associated with the product data is set to "pending", and the product status is set to "draft submission completed" if all the part statuses in the part data associated with the product data are set to "draft submission completed". Therefore, in FIG. 5, the product status may not be set in Step 404, the product status may then be set to "pending" at a timing at which any of part statuses in part data associated with the product data in Step 407 is set to "pending", and the product status may be set to "draft submission completed" at a timing at which all the part statuses in the part data associated with the product data are set to "draft submission completed". The post-processing start scheduled date and time is a date and time when post-processing for completing the product of the order acceptance is scheduled to start.

FIG. 8 is a diagram illustrating an example of part data written in the order database 43. As illustrated in the drawing, the part data associates a part ID, a part name, the number of pages, the number, a part status, a print start scheduled date and time, a printer name, and the like. Here, the part ID is identification information for uniquely identifying a part of a product of an order acceptance (hereinafter, referred to as a part of an order acceptance). The product data is associated with the part data by producing the part ID as a combination of a product ID of the product corresponding to the part with a part branch number. However, the product data may be associated with the part data by providing an item indicating a link to the part data in the product data and providing an item indicating a link to the product data in the part data. The part name is a name of the part of the order acceptance. The number of pages is the number of pages of the part of the order acceptance. The number is the number of parts of the order acceptance. The part status is a current state of the part of the order acceptance. A part status of a part with a part ID "10000-1-1" is set to "pending", and a part status of a part with a part ID "10000-1-3" is set to "draft submission completed". The print start scheduled date and time is a date and time when printing of the part of the order acceptance is started. The printer name is a name of the printing device 50 used for the printing of the part of the order acceptance.

If the user performs an operation of changing the status from "draft submission completed" to "pending" while designating a specific part after the order data is written in the order data base 43 in this manner, the order data management unit 42 changes the part status in the part data from "draft submission completed" to "pending".

FIG. 9 is a diagram illustrating an example of an order management screen on which such an operation is performed. As illustrated in the drawing, information regarding order acceptance with an order acceptance ID "10000", information regarding a product with a product ID "10000-1" included in the order acceptance, and information regarding a part with a part ID "10000-1-1" and a part with a part ID "10000-1-3"included in the product are shown in an order data display field 301 on the order management screen. Also, the fact that the part status of the part with the part ID "10000-1-1" is "pending" and the fact that the part status of the part with the part ID "10000-1-3" is "draft submission completed" are shown. It is assumed that the user selects the part with the part ID "10000-1-3" and presses a pending button 302 as illustrated with the surrounding thick line in the drawing in this state. Then, a confirmation screen (not illustrated) for confirming whether or not the part with the part ID "10000-1-3" may be brought into a pending state is displayed, for example, and the user presses "OK" on the confirmation screen.

FIG. 10 is a diagram illustrating an example of an order management screen displayed thereafter. As illustrated in the drawing, the part status of the part with the part ID "10000-1-3" is "pending" on the order management screen.

However, in a case in which the period obtained by subtracting the current date and time from the shipping scheduled date and time has become less than the grace period in regard to the part selected by the user in FIG. 9, the order data management unit 42 may not change the part status of the part from "draft submission completed" to "pending". For example, the order data management unit 42 delivers the fact that the order data management unit 42 cannot change the part status of the part from "draft submission completed" to "pending" to the screen management unit 44. Then, the screen management unit 44 may create an order management screen in which parts that may be brought into a pending state and parts that cannot be brought into a pending state are displayed in different modes for each part, and the display control unit 45 may display the order management screen. Alternatively, in a case in which the user performs an operation of selecting a part and the operation receiving unit 46 receives the operation, the display control unit 45 may gray down the pending button 302. Further, in a case in which the user performs the operation of selecting a part and pressing the pending button 302 and the operation receiving unit 46 receives the operation, the display control unit 45 may display a message indicating that the part cannot be brought into a pending state.

Meanwhile, in a case in which the period obtained by subtracting the current date and time from the shipping scheduled date and time of the product has become less than the grace period, the order data management unit 42 changes the part status in the part data from "pending" to "draft submission completed".

Figure 11:
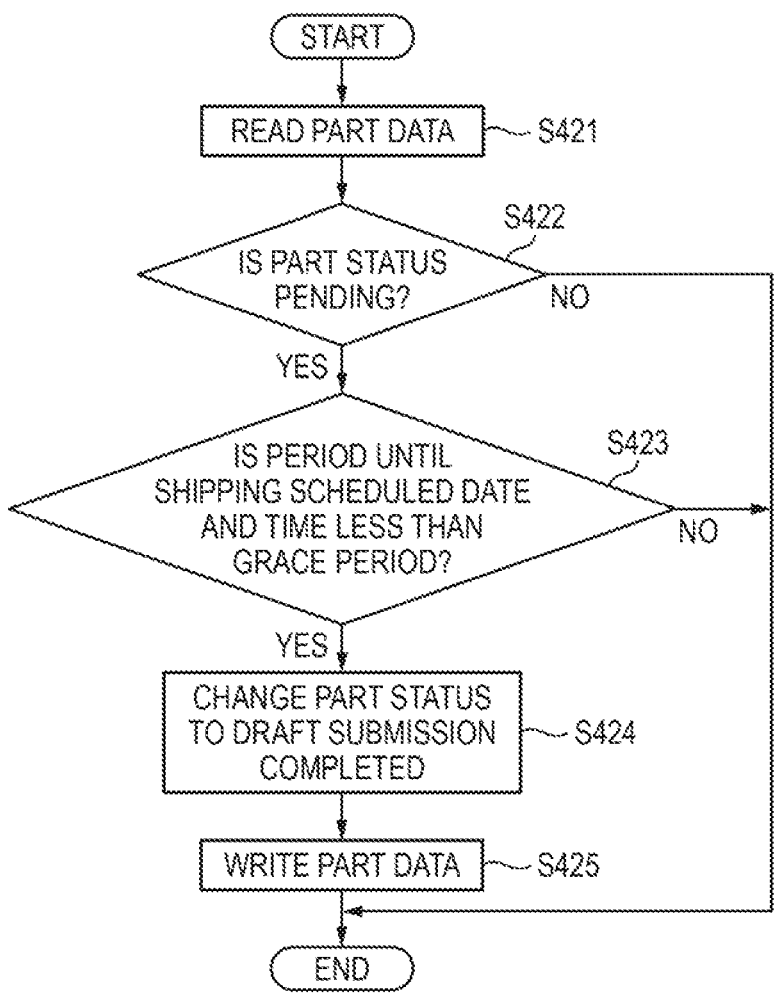
FIG. 11 is a flowchart illustrating an operation example of the order data management unit when the status of the part is changed from "pending" to "draft submission completed" through determination of a period according to the first exemplary embodiment of the invention.

FIG. 11 is a flowchart illustrating an operation example of the order data management unit 42 at this time. Note that although FIG. 11 illustrates processing related to one part data item in the order database 43, the processing is repeated for all part data items in the order database 43 in practice.

First, the order data management unit 42 reads part data from the order database 43 (Step 421).

Next, the order data management unit 42 determines whether or not the part status in the part data is "pending" (Step 422). If it is determined that the part status is not "pending", that is, if it is determined that the part status is "draft submission completed", the order data management unit 42 ends the processing. If it is determined that the part status is "pending", the order data management unit 42 determines whether or not the period until the shipping scheduled date and time, that is, the period obtained by subtracting the current date and time from the shipping scheduled date and time has become less than the grace period (Step 423).

If it is not determined that the period until the shipping schedule date and time has become less than the grace period, that is, it is determined that the period until the shipping scheduled date and time is equal to or greater than the grace period, the order data management unit 42 ends the processing. If it is determined that the period until the shipping scheduled date and time has become less than the grace period, the order data management unit 42 changes the part status in the part data from "pending" to "draft submission completed" (Step 424).

Thereafter, the order data management unit 42 writes the part data in which the part status has been changed to "draft submission completed" in this manner the order database 43 (Step 425).

If the user performs the operation of changing the status from "pending" to "draft submission completed" while designating the specific part, the order data management unit 42 changes the part status in the part data from "pending" to "draft submission completed". This may be performed by selecting the part with the part ID "10000-1-1" and the part with the part ID "10000-1-3" and pressing a pending cancelation button 303 on the order management screen illustrated in FIG. 10, for example.

Thereafter, the grouping unit 47 performs grouping on parts with part statuses of "draft submission completed" in the part data as targets.

Finally, the transmission unit 48 transmits the part data related to these parts to the printing device 50 such that the grouped parts (parts collected in the same group) are sequentially printed by the printing device 50.

Note that although the order data management unit 42 changes the status of the "pending" parts to "draft submission completed" when the period obtained by subtracting the current date and time from the shipping scheduled date and time has become less than the grace period and the grouping unit 47 performs the grouping on the parts with the status of "draft submission completed" as targets in the operation example illustrated in FIG. 11, the exemplary embodiment is not limited thereto. The grouping unit 47 may perform grouping without changing the status to "draft submission completed" in a case in which the period obtained by subtracting the current date and time from the shipping scheduled date and time of the "pending" part has become less than the grace period.

Incidentally, the first exemplary embodiment is adapted on the assumption that parts are grouped, the exemplary embodiment may be adapted on the assumption that products are grouped as described above. Also, grouping of order acceptance including plural products is similarly conceivable.

In a case in which products are grouped, for example, a pending flag is provided in product data, and the product status in the product data may be set to "pending" if the pending flag is "ON". In such a case, all the part statuses in the part data associated with the product data may be set to be the same as the product status in the product data.

Also, in a case in which order acceptance is grouped, a pending flag is provided in order acceptance data, and the order acceptance status in the order acceptance data may be set to "pending" if the pending flag is "ON". In such a case, all the product statuses in the product data associated with the order acceptance data and all the part statuses in the part data associated with the order acceptance data may be set to be the same as the order acceptance status in the order acceptance data.

Second Exemplary Embodiment

Functional Configuration of Print Management Device

A functional configuration of a print management device 30 according to a second exemplary embodiment is substantially the same as that illustrated in FIG. 4. Details of processing performed by functions of the print management device 30 according to the second exemplary embodiment are different from those in the first exemplary embodiment only in the order data management unit 42, only the order data management unit 42 will be described.

The order data management unit 42 acquires the instruction data from the reception unit 41 and stores order data in the order database 43. Specifically, the order data management unit 42 picks up the order acceptance description from the instruction data and stores the order acceptance data in the order database 43, picks up the product description from the instruction data and stores the product data in the order database 43, and picks up the part description from the instruction data and stores the part data in the order database 43.

At this time, the order data management unit 42 sets the part status in the part data to any of "draft submission completed", "ordinary pending", and "forced pending". Among them, "ordinary pending" is "pending" that is to be changed to "draft submission completed" in a case in which a period obtained by subtracting a current date and time from a shipping scheduled date and time has become less than a grace period and corresponds to "pending" in the first exemplary embodiment. Meanwhile, "forced pending" that is "pending" that is not to be changed to "draft submission completed" even if the period obtained by subtracting the current date and time from the shipping scheduled date and time has become less than the grace period is also set in the second exemplary embodiment. Here, an item indicating which of "draft submission completed", "ordinary pending", and "forced pending" the part status is to be set to may be necessarily designated in the part description in the instruction data. For example, a pending flag may be provided in the part description in the instruction data, and the part status may be set to "forced pending" if the pending flag is "1", the part status may be set to "ordinary pending" if the pending flag is "2", and the part status may be set to "draft submission completed" may be set if the pending flag is "0". Alternatively, the item indicating which of "draft submission completed", "ordinary pending", and "forced pending" the part status is to be set to may be arbitrarily designated in the part description in the instruction data, and in a case in which there is no designation, the print management device 30 may hold the item in system setting related to pending. In a case in which no pending flag is provided in the part description in the instruction data, for example, the part status may be set to "forced pending" if the system setting related to pending is "1", the part status may be set to "ordinary pending" if the system setting related to pending is "2", and the part status may be set to "draft submission completed" if the system setting related to pending is "0".

In the exemplary embodiment, the order data management unit 42 is provided as an example of the exclusion section that excludes specific print data from plural print data items. Also, a pending flag is used as an example of exclusion availability information indicating whether or not the specific print data included in the management data is to be excluded, and the order data management unit 42 is provided as an example of the exclusion section that decides whether or not the specific print data is to be excluded from the plural print data items on the basis of the exclusion availability information. Further, the pending flags "1" and "2" are used as examples of indicating that the specific print data indicated by exclusion availability information is to be excluded, and system settings "1" and "2" related to pending are used as examples of indicating that the specific print data stored in the device itself is to be excluded. Also, "forced pending" is used as an example of the first exclusion mode, "ordinary pending" is used as an example of the second exclusion mode, and the order data management unit 42 is provided as an example of the exclusion section that excludes the specific print data among the plural print data items in an exclusion mode selected from the first exclusion mode and the second exclusion mode. It is also possible to state that the order data management unit 42 may receive selection of either the first exclusion mode or the second exclusion mode. Also, the pending flags "1" and "2" may not only set by the instruction data, and the first exclusion mode or the second exclusion mode may be set in response to a user's instruction or the like after the reception unit 41 receives the instruction data. Further, the order data management unit 42 is provided as an example of the exclusion section that does not cancel the exclusion of the specific print data even if the period until the processing deadline of the specific print data has become less than a predetermined period in a case in which the specific print data is excluded from the plural print data items in the first exclusion mode. Here, in a case in which the specific print data is excluded in the second exclusion mode, the order data management unit 42 cancels the exclusion of the specific print data if the period until the processing deadline has become less than the predetermined period. Note that the condition under which exclusion is not cancelled for print data excluded in the first exclusion mode and exclusion is canceled for print data excluded in the second exclusion mode may be another condition rather than the condition that "the period until the processing deadline has become less than the predetermined period". Also, exclusion of the print data excluded in the first exclusion mode may be cancelled by the user at an arbitrary timing. Since exclusion of the print data excluded in the second exclusion mode is cancelled if the period until the processing deadline has become less than the predetermined period, the user does not cancel the exclusion at a timing after then.

Also, in a case in which the user performs an operation of changing the status to "draft submission completed" to "ordinary pending" while designating the specific part, the order data management unit 42 changes the part status in the part data to "ordinary pending" in response to the operation. However, in a case in which the predetermined condition is satisfied, the order data management unit 42 may refuse the part status in the part data to "ordinary pending". For example, the order data management unit 42 may refuse to change the part status in the part data to "ordinary pending" if the period obtained by subtracting the current date and time from the shipping scheduled data and time of the product has become less than the grace period. Also, in a case in which the predetermined condition is satisfied, the order data management unit 42 may refuse to change the part status in the part data from "draft submission completed" to "forced pending" and may further refuse to change the part status from "ordinary pending" to "forced pending".

In the exemplary embodiment, an operation of changing the status from "draft submission completed" to either "ordinary pending" or "forced pending" while designating a specific part is used as an example of an operation of excluding the specific print data. Also, the period obtained by subtracting the current date and time from the shipping scheduled date and time of the product is used as an example of the period until the processing deadline of the specific print data, the grace period is used as an example of the predetermined period, and the order data management unit 42 is provided as an example of the exclusion section that does not exclude the specific print data from the plurality of print data items if the period until the processing deadline of the specific print data has become less than the predetermined period.

Further the order data management unit 42 changes the part status in the part data to "draft submission complete'" as pre-processing of grouping after the part status in the part data becomes "ordinary pending'. Specifically, in a case in which the predetermined condition is satisfied, the part status in the part data may be changed from "ordinary pending" to "draft submission completed". Here, a condition that a period obtained by subtracting a current date and time from a shipping scheduled date and time of the product has become less than a grace period is conceivable as the predetermined condition. A condition that the user has performed an operation of changing the status from "ordinary pending" to "draft submission completed" while designating the specific part is also conceivable.

In the exemplary embodiment, the order data management unit 42 is provided as an example of the exclusion section that cancels exclusion of specific print data form plural print data items in a case in which the predetermined condition is satisfied. The period obtained by subtracting the current date and time from the shipping scheduled date and time of the product is used as an example of the period until the processing deadline of the specific print data, and the grace period is used as an example of the predetermined period. Further, the user's operation of changing the status from "pending" to "draft submission completed" while designating the specific part is used as an example of the operation of cancelling the exclusion of the specific data.

Note that although the order data management unit 42 may set the part status to "forced pending" when the part data is stored in the order database 43 in the above description, exemplary embodiments are not limited thereto. The order data management unit 42 may be adapted to be able to set the part status to either "draft submission completed" or "ordinary pending" when the part data is stored in the order database 43 and set the part status to "forced pending" only in a case in which the user performs the operation while designating the part.

Operations of Print Management Device 30

In the print management device 30, the receiving unit 41 first receives instruction data from the order acceptance management device 10 and outputs the instruction data to the order data management unit 42.

Then, the order data management unit 42 acquires the instruction data from the receiving unit 41.

Figure 12:
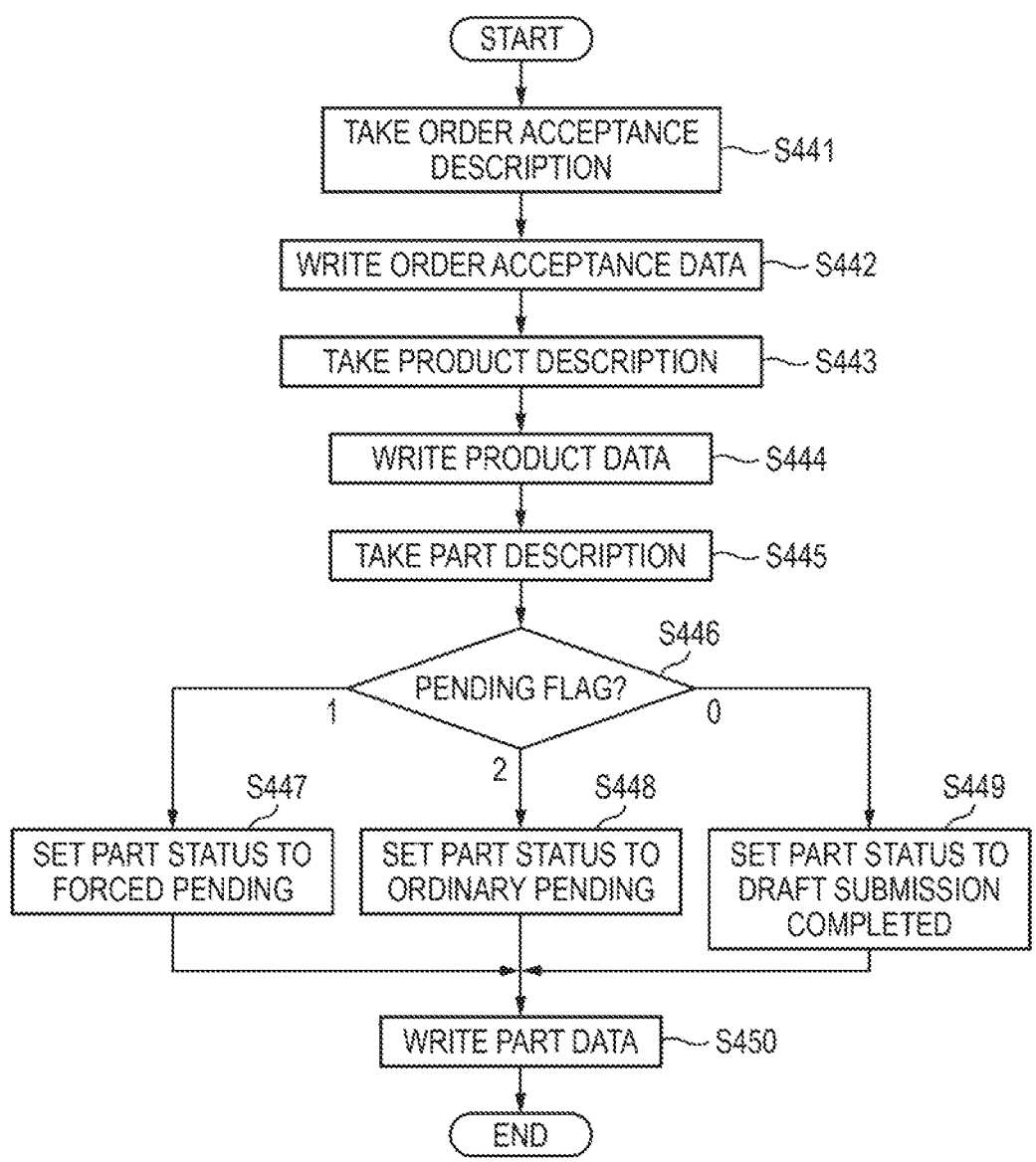
FIG. 12 is a flowchart illustrating an operation example of an order data management unit after instruction data is acquired according to a second exemplary embodiment of the invention.

FIG. 12 is a flowchart illustrating an operation example of the order data management unit 42 thereafter. Note that although FIG. 12 illustrates processing related to one order acceptance description in instruction data, the processing is repeated for all order acceptance descriptions in the instruction data in practice. Also, description will be given on the assumption that a pending flag is provided in a part description in the instruction data.

First, the order data management unit 42 picks up the order acceptance description from the instruction data (Step 441). Then, the order data management unit 42 writes order acceptance data created on the basis of the order acceptance description in the order database 43 (Step 442).

Next, the order data management unit 42 picks up a product description associated with the order acceptance description picked up in Step 441 from the instruction data (Step 443). In a case in which the instruction data includes the order acceptance order in the first layer, includes the product description in the second layer, and includes the part description in the third layer, for example, the product description in a layer just below that of the order acceptance description picked, up in Step 441 may be picked up as the product description associated with the order acceptance description. If there are plural product descriptions, all of them may be picked up. Then, product data created on the basis of the product description is written in the order database 43 (Step 444).

Then, the order data management unit 42 picks up a part description associated with the product description picked up in Step 443 from the instruction data (Step 445). In a case in which the instruction data includes the order acceptance description in the first layer, includes the product description in the second layer, and includes the part description in the third layer, for example, the part description in the layer just below that of the product description picked up in Step 443 may be picked up as the part description associated with the product description. If there are plural product descriptions, all of them may be picked up.

In this manner, the order data management unit 42 determines a value of the pending flag included in the part description (Step 446). If it is determined that the pending flag is "1", the order data management unit 42 sets the part status to be "forced pending" in the part data created on the basis of the part description (Step 447). If it is determined that the pending flag is "2", the order data management unit 42 sets the part status to be "ordinary pending" in the part data created on the basis of the part description (Step 448). If it is determined that the pending flag is "0", the order data management unit 42 sets the part status to be "draft submission completed" in the part data created on the basis of the part description (Step 449).

Thereafter, the order data management unit 42 writes the part data with the part status set to any of "forced pending", "ordinary pending", and "draft submission completed" in this manner in the order database 43 (Step 450).

Next, various kinds of data written in the order database 43 through operations illustrated in FIG. 12 will be described. Since the order acceptance data written in the order database 43 is the same as that illustrated in FIG. 6, description thereof will be omitted. Since the product data written in the order database 43 is the same as that illustrated in FIG. 7, description thereof will be omitted. Since the part data written in the order database 43 is the same as that illustrated in FIG. 8 other than that "ordinary pending" or "forced pending" is set as the part status rather than "pending", description thereof will be omitted.

If the user performs an operation of changing the status from "draft submission completed" to either "ordinary pending" or "forced pending" while designating a specific part after the order data is written in the order database 43 in this manner, the order data management unit 42 changes the part status in the part data from "draft submission completed" to the designated one of "ordinary pending" and "forced pending". Since the order management screen on which such an operation is performed is the same as those illustrated in FIGS. 9 and 10 other than that "ordinary pending" or "forced pending" is displayed rather than "pending" as a part status, description thereof will be omitted. Note that display modes may be differentiated such that the operator may identify "ordinary pending" and "forced pending". In a case in which the display modes are differentiated, "ordinary pending" or "forced pending" may be displayed using letters, and further, a mode in which character attributes (for example, fonts, colors, thicknesses, and underlines) are differentiated, a mode in which the entire rows in which attributes of parts are displayed are surrounded by frames, a mode in which hatching is applied, and the like are conceivable.

Meanwhile, in a case in which the period obtained by subtracting the current date and time from the shipping scheduled date and time of the product has become less than the grace period, the order data management unit 42 changes the part status in the part data from "ordinary pending" to "draft submission completed". Since the operation example of the order data management unit 42 is achieved merely by replacing "pending" in Step 422 in FIG. 11 with "ordinary pending", description thereof will be omitted.

Thereafter, the grouping unit 47 performs grouping on parts with part statuses of "draft submission completed" in the part data as targets.

Finally, the transmission unit 4 transmits the part data related to these parts to the printing device 50 such that the grouped parts (parts collected in the same group) are sequentially printed by the printing device 50.

Incidentally, the second exemplary embodiment is adapted on the assumption that parts are grouped, the second exemplary embodiment may be adapted on the assumption that products are grouped as described above. Also, grouping of order acceptance including plural products is similarly conceivable.

In a case in which products are grouped, for example, a pending flag may be provided in the product data, the product status in the product data may be set to "forced pending" if the pending flag is "1" or the product status in the product data may be set to "ordinary pending" if the pending flag is "2", in such a case, all the part statuses in the part data associated with the product data may be set to be the same as the product status in the product data.

In a case in which order acceptance is grouped, a pending flag may be provided in the order acceptance data, and the order acceptance status in the order acceptance data may be set to "forced pending" if the pending flag is "1", or the order acceptance status in the order acceptance data may be set to "ordinary pending" if the pending flag is "2". In such a case, all the product statuses in the product data associated with the order acceptance data and all the part statuses in the part data associated with the order acceptance data may be set to be the same as the order acceptance status in the order acceptance data. cl Third Exemplary Embodiment Functional Configuration of Print Management Device A functional configuration of a print management device 30 according to a third exemplary embodiment is substantially the same as that illustrated in FIG. 4. Since details of processing performed by functions of the print management device 30 according to the third exemplary embodiment are different from those in the first exemplary embodiment only in the order data management unit 42, only the order data management unit 42 will be described.

The order data management unit 42 acquires the instruction data from the reception unit 41 and stores order data in the order database 43. Specifically, the order data management unit 42 picks up the order acceptance description from the instruction data and stores the order acceptance data in the order database 43, picks up the product description from the instruction data and stores the product data in the order database 43, and picks up the part description from the instruction data and stores the part data in the order database 43.

At this time, the order data management unit 42 sets a part status in the part data to either "draft submission completed" or "pending". Here, an item indicating which of "draft submission completed" and "pending" the part status is to be set to ma be necessarily designated in the part description in the instruction data. For example, a pending flag may be provided in the part description in the instruction data, the part status may be set to "pending" if the pending flag is "ON", or the part status may be set to "draft submission completed" if the pending flag is "OFF". Alternatively, an item indicating which of "draft submission completed" or "pending" the part status is to be set to may be arbitrarily designated in the part description in the instruction data, and in a case in which there is no designation, the print management device 30 may hold the item in system setting related to pending. In a case in which no pending flag is provided in the part description in the instruction data, for example, the part status may be set to "pending" if the system setting related to pending is "ON", and the part status may be set to "draft submission completed" if the system setting related to pending is "OFF".

In the exemplary embodiment, the order data management unit 42 is provided as an example of the exclusion section that excludes specific print data from plural print data items. Also, a pending flag is used as an example of exclusion availability information indicating whether or not the specific print data included in the management data is to be excluded, and the order data management unit 42 is provided as an example of the exclusion section that decides whether or not the specific print data is to be excluded from the plural print data items on the basis of the exclusion availability information, Further, the pending flag "ON" is used as an example of indication that the specific print data indicated by the exclusion availability information is to be excluded, and the, system setting "ON" related to pending is used as an example of indication that the specific data stored in the device itself is to be excluded.

In addition to this, the order data management unit 42 sets a pending cancellation date and time for a part with a status of "pending". Alternatively, the pending cancellation date and time may be unset, "Forced pending" according to the second exemplary embodiment is realized by not setting the pending cancellation date and time while the part status is "pending". Here, an item indicating whether or not to set the pending cancellation date and time may be necessarily designated in the part description in the instruction data. For example, a pending cancellation date and time setting flag may be provided in the part description in the instruction date, and the pending cancellation date and time may be set if the pending cancellation date and time setting flag is "ON", or the pending cancellation date and time may be unset if the pending cancellation date and time setting flag is "OFF". Alternatively, the item indicating whether or not to set the pending cancellation date and time may be arbitrarily designated in the part description in the instruction data, and in a case in which no designation is included, the print management device 30 may hold the item in system setting regarding the pending cancellation date and time setting. In a case in which the pending cancellation date and time setting flag is not provided in the part description in the instruction data, for example, the pending cancellation date and time may be set if the system setting related to the pending cancellation date and time setting is "ON", or the pending cancellation date and time may be unset if the system setting related to the pending cancellation date and time setting is "OFF". Further, it is also conceivable that the pending cancellation date and time are always set or always unset in regard to whether or not to set the pending cancellation date and time. Here, the pending cancellation date and time may be a date and time obtained by subtracting a grace period from the shipping scheduled date and time of the product of the order acceptance or may be a date and time arbitrarily decided for the order acceptance. However, the order data management unit 42 is adapted to set the status to "draft submission completed" even if there is a designation of "pending" as long as the pending cancellation date and time are earlier than the date and time when the instruction data is acquired.

In the exemplary embodiment, the pending cancellation date and time are used as an example of a cancellation time that is a time at which exclusion of specific print data from plural print data items is cancelled, and the order data management unit 42 is provided as an example of the storage section that stores the cancellation time in an associated manner with the specific print data. Also, the order data management unit 42 is provided as an example of the storage section that stores the cancellation time in an associated winner with the specific print data when the specific print data is excluded from the plural print data items in response to the specification of the plural print data items.

Also, in a case in which the user performs an operation of changing the status from "draft submission completed" to "pending" while designating a specific part, the order data management unit 42 changes the part status in the part data to "pending" in response to the operation. Then, the order data management unit 42 may set the pending cancellation date and time for the part data in a case in which the part status in the part data is changed to "pending". Here, the pending cancellation date and time may be a date and time obtained by subtracting a grace period from the shipping scheduled date and time of the product of the order acceptance or may be a date and time arbitrarily decided for the order acceptance. Alternatively, the pending cancellation date and time may be unset. However, the order data management unit 42 may refuse setting of the pending cancellation date and time as long as the pending cancellation date and time are earlier than the date and time when the instruction data is acquired.

In the exemplary embodiment, the operation of changing the status from "draft submission completed" to "pending" while designating the specific part is used as an example of the operation of excluding the specific print data. Also, the order data management unit 42 is provided as an example of the storage section chat stores the cancellation time in an associated mariner with the specific print data when the specific print data is excluded from the plural print data items in response to an operator's operation of excluding the specific print data from the plural print data items.

Further, the order data management unit 42 changes the part status in the part data to "draft submission completed" as preprocessing of grouping after the part status in the part data becomes "pending". Specifically, in a case in which a predetermined condition is satisfied, the part status in the part data may be changed from "pending" to "draft submission completed". Here, a condition that, the part status in the part data is "pending", the pending cancellation date and time are set in the part data, and the pending cancellation date and time have been reached is conceivable as the predetermined condition. In this case, although the part status in the part data is "pending", the part status is maintained to be "pending" in a case in which no pending cancellation date and time have been set in the part data. A condition that the user has designated a specific part and has performed an operation of Changing the status from "pending" to "draft submission completed" is also conceivable as the predetermined condition.

In the exemplary embodiment, the order data management unit 42 is provided as an example of exclusion section that cancels exclusion of specific print data form plural print data items in a case in which the predetermined condition is satisfied. Also, the order data management unit 42 is provided as an example of the exclusion section that cancels the exclusion of the specific print data from the plural print data items if the cancellation time is reached. Further, the user's operation of changing the status from "pending" to "draft submission completed" white designating the specific part is used as an example of the operation of cancelling the exclusion of the specific data.

Operations of Print Management Device 30

In the print management device 30, the receiving unit 41 first receives instruction data from the order acceptance management device 10 and outputs the instruction data to the order data management unit 42.

Then, the order data management unit 42 acquires the instruction data from the receiving unit 41.

Figure 13:
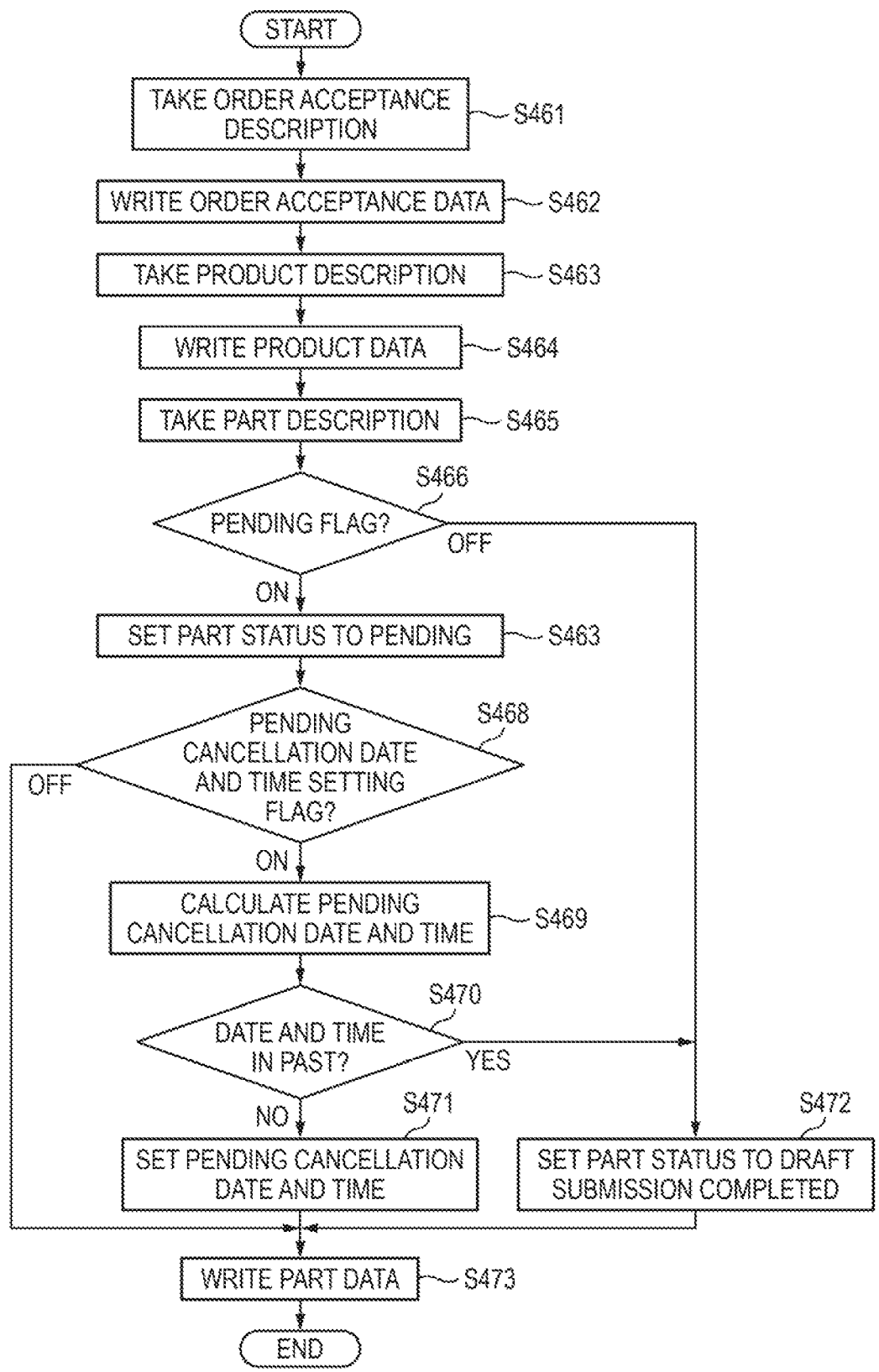
FIG. 13 is a flowchart illustrating an operation example of an order data management unit after instruction data is acquired according to a third exemplary embodiment of the invention.

FIG. 13 is a flowchart illustrating an operation example of the order data management unit 42 thereafter., Note that although FIG. 13 illustrates processing related to one order acceptance description in instruction data, the processing is repeated for all order acceptance descriptions in the instruction data in practice. Also, the description will be given on the assumption that a pending flag and a pending cancellation date and time setting flag are provided for a part description in the instruction data.

First, the order data management unit 43 picks up an order reception description from the instruction data (Step 461). Then, the order data, management unit 42 writes order acceptance data created on the basis of the order acceptance description in the order database 43 (Step 462).

Next, the order data management unit 42 picks up a product description associated with the order acceptance description picked up in Step 461 from the instruction data (Step 463). In a case in which the instruction data includes the order acceptance description in a first layer, includes the product description in a second, layer, and includes a part description in a third layer, for example, the product description in a layer just below the layer of the order acceptance description picked up in Step 461 may be picked up as the product description associated with the order acceptance description. If there are plural product descriptions, all of them may be picked up. Then, the product data created on the basis of the product description is written in the order database 43 (Step 464).

Then, the order data management unit 42 picks up a part description associated with the product description picked up in Step 463 from the instruction data (Step 465). In a case in which the instruction data includes the order acceptance description in the first layer, includes the product description in the second layer, and includes the part description in the third layer, for example, the part description in the layer just below that of the product description picked up in Step 463 may be picked up as the part description associated with the product description. If there are plural part descriptions, all of them may be picked up.

In this manner, the order data management unit 42 determines a value of the pending flag included in the part description (Step 466). If it is determined that the pending flag is "ON", the order data management unit 42 sets the part status to "pending" in the part data created on the basis of the part description (Step 467).

Then, the order data management unit 42 determines a value of the pending cancellation date and time setting flag included in the part description (Step 468). If it is determined that the pending cancellation date and time setting flag is "ON", the order data management unit 42 calculates the pending cancellation date and time by subtracting a grace period from a shipping scheduled date and time, for example (Step 469). Then, it is determined whether or not the pending cancellation time are a date and time in the past when seen from the current date and time (Step 470). If it is not determined that the pending cancellation time and data are a date and time in the past, that is, if it is determined that the pending cancellation date and time have not yet been reached, the order data management unit 42 sets a pending cancellation date and time for the part data created on the basis of the part description (Step 471) and moves on to processing in Step 473.

Meanwhile, in a case in which it is not determined that the pending flag is "ON" in Step 466, or in a case in which the pending cancellation date and time are determined to be a date and time in the past in Step 470, the order data management unit 42 sets the part status to "draft submission completed" in the part data created on the basis of the part description (Step 472) and moves on to processing in Step 473.

If it is determined that the pending cancellation date and time setting flag is "OFF" in Step 468, the processing proceeds to Step 473 without performing calculation and setting of the pending cancellation date and time.

Thereafter, the part status is set to either "pending" or "draft submission completed" in this manner, and in a case in which the part status is set to pending", the order data management unit 42 writes the part data for which the pending cancellation data and time have been set or have not yet been set in the order database 43 (Step 473).

Next, various kinds of data to be written in the order database 43 through operations illustrated in FIG. 13 will be described. Since the order acceptance data written in the order database 43 is the same as that illustrated in FIG. 6, description thereof will be omitted. Since the product data written in the order database 43 is the same as that illustrated in FIG. 7, description thereof will be omitted.

FIG. 14 is a diagram illustrating an example of part data written in the order database 43. As illustrated in the drawing, part data is adapted to associate a part ID, a part name, the number of pages, the number of parts, a part status, a pending cancellation date and time, a print start scheduled date and time, a printer name, and the like. Here, since the part ID, the part name, the number of pages, the number of parts, the part status, the print start scheduled date and time, and the printer name are the same as those illustrated in FIG. 8, and description thereof will be thus omitted. The pending cancellation date and time are a date and time at which pending is canceled in a case in which the part status is set to "pending". For example, the pending cancellation date and time of the part with a part ID "10000-1-1" is set to three days before a shipping scheduled date and time of order acceptance data.

If the user performs an operation of changing the status from "draft submission completed" to "pending" while designating a specific part after the order data is written in the order data base 43 in this manner, the order data management unit 42 changes the part status in the part data from "draft submission completed" to "pending". Since the order management screen on which such an operation is performed is the same as those illustrated in FIGS. 9 and 10 other than that the pending cancellation date and time are displayed, description thereof will be omitted.

Meanwhile, in a case in which the period obtained by subtracting the current date and time from the shipping scheduled date and time of the product has become less than the grace period, the order data management unit 42 changes the part status in the part data from "pending" to "draft submission completed".

Figure 15:
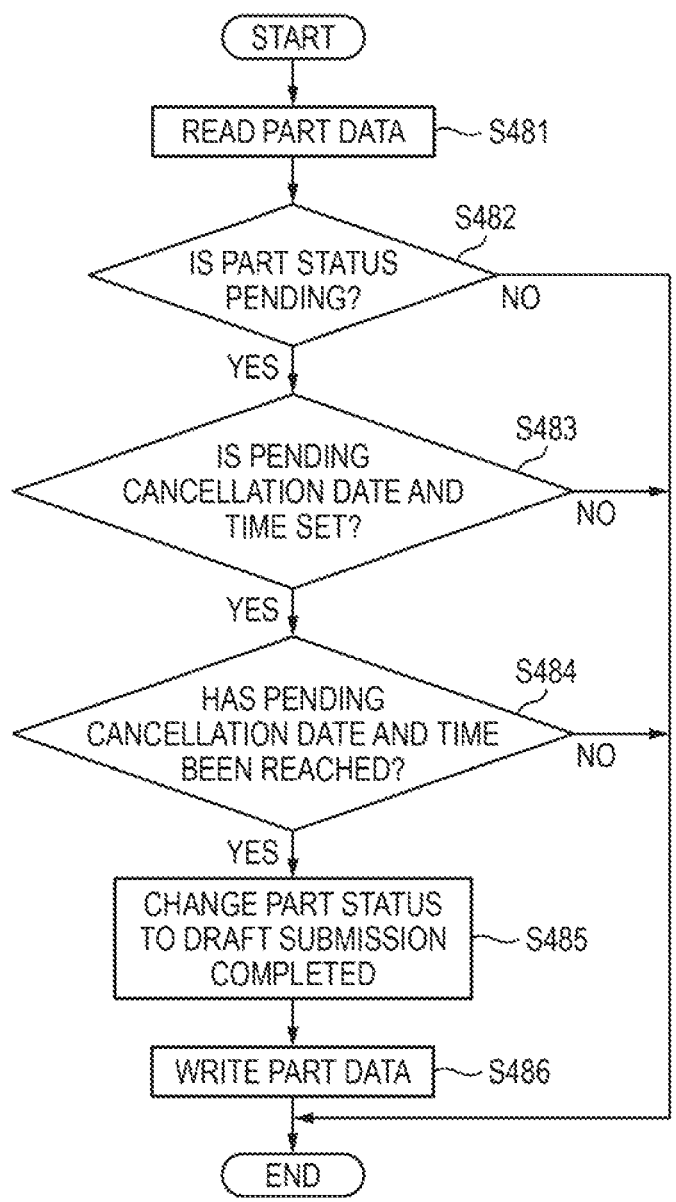
FIG. 15 is a flowchart illustrating an operation example of an order data management unit when a status of a part is changed from "pending" to "draft submission completed" through determination of a period according to the third exemplary embodiment of the invention.

FIG. 15 is a flowchart illustrating an operation example of the order data management unit 42 at this time. Note that although FIG. 15 illustrates processing related to one part data item in the order database 43, the processing is repeated for all the part data items in the order database 43 in practice.

First, the order data management unit 42 reads part data from the order database 43 (Step 481).

Next, the order data management unit 42 determines whether or not a part status in the part data is "pending" (Step 482). If it is determined that the part status is not "pending", that is, if it is determined that the part status is "draft submission completed", the order data management unit 42 ends the processing. If it is determined that the part status is "pending", the order data management unit 42 determines whether or not a pending cancellation date and time is set for the part data (Step 483).

If it is not determined that the pending cancellation date and time is set for the part data, the order data management unit 42 ends the processing. If it is determined that the pending cancellation date and time has been set for the part data, the order data management unit 42 determines whether or not the pending cancellation date and time have been reached (Step 484).

If it is not determined that the pending cancellation date and time have been reached, the order data management unit 42 ends the processing. If it is determined that the pending cancellation date and time have been reached, the order data management unit 42 changes the part status in the part data from "pending" to "draft submission completed" (Step 485).

Thereafter, the order data management unit 42 writes the part data with the part status changed to "draft submission completed" in this manner in the order database 43 (Step 486).

If the user performs the operation of changing the status from "pending" to "draft submission completed" while designating the specific part, the order data management unit 42 changes the part status in the part data from "pending" to "draft submission completed". This may be performed by selecting the part with the part ID "10000-1-1" and the part with the part ID "10000-1-3" and pressing a pending cancelation button 303 on the order management screen illustrated in FIG. 10, for example.

Thereafter, the grouping unit 47 performs grouping on parts with part statuses of "draft submission completed" in the part data as targets.

Finally, the transmission unit 48 transmits the part data related to these parts to the printing device 50 such that the grouped parts (parts collected in the same group) are sequentially printed by the printing device 50.

Incidentally, although the third exemplary embodiment is adapted on the assumption that parts are grouped, the exemplary embodiment may be adapted on the assumption that products are grouped as described above. Also, grouping of order acceptance including plural products is similarly conceivable.

In a case in which products are grouped, for example, a pending flag and a pending cancellation date and time setting flag are provided in product data, and a product status in the product data may be set to "pending" if the pending flag is "ON", or a pending cancellation date and time may be set in the product data if the pending cancellation date and time setting flag is "ON". In such a case, both the part status and the pending cancellation date and time in the part data associated with the product data may be set to be the same as the product status and the pending cancellation date and time in the product data.

In a case in which order acceptance is grouped, a pending flag and a pending cancellation date and time setting flag are set for order acceptance data, and the order acceptance status in the order acceptance data may be set to "pending" if the pending flag is "ON", or the pending cancellation date and time may be set in the order acceptance data if the pending cancellation date and time setting flag is "ON". In such a case, all of the product status and the pending cancellation date and time in the product data associated with the order acceptance data and the part status and the pending cancellation date and time in the part data associated with the order acceptance data may be set to be the same as the order acceptance status and the pending cancellation date and time in the order acceptance data.

Note that although the exemplary embodiment is adapted on the assumption that parts are grouped, the exemplary embodiment may be adapted on the assumption that products are grouped as described above. Also, grouping of order acceptance including plural products is similarly conceivable.

In a case in which products are grouped, for example, a pending flag is provided in product data, and the product status in the product data may be set to "pending" if the pending flag is "ON". In such a case, all the part statuses in the part data associated with the product data may be set to "pending".

In, a case in which order acceptance is grouped, for example, a pending flag is provided for the order acceptance data and the order acceptance status in the order acceptance data may be set to "pending" if the pending flag is "ON". In Such a case, both the product status in the product data associated with the order acceptance data and the part status in the part data associated with the order acceptance data may be set to "pending".

Program

The processing that the print management device 30 according to the exemplary embodiment is prepared as a program for application software or the like, for example.

That is, the program that realizes the exemplary embodiment is conceivable as a program for causing a computer to realize a function of specifying plural print data items that are scheduled to be included in a print unit that is a unit of sequential printing, of a printing device, a function of excluding specific print data from the plurality of specified print data items, and a function of performing control such that the print unit after the specific print data is excluded is printed by the printing device.

Note that the program that realizes the exemplary embodiment may be provided by a communication mechanism, of course, and may also be provided by being stored in a recording medium such as a CD-ROM.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control device comprising at least one processor configured to:
   extract a plurality of print data items to be included in a print unit, the print unit being a unit of sequential printing by a printing device;
   exclude a specific print data item among the plurality of print data items extracted, from the print unit; and
   control such that the print unit from which the specific print data item is excluded is printed by the printing device;

wherein, in a case where a predetermined condition is satisfied after the specific print item data is excluded from the print unit, the exclusion of the specific print item data from the plurality of the print data is canceled.

2. The print control device according to claim 1,
wherein the predetermined condition is satisfied in a case where a period until a processing deadline of the specific print data item becomes shorter than a predetermined period.

3. The print control device according to claim 1,
wherein the predetermined condition is satisfied in a case where an operator performs an operation for canceling the exclusion of the specific print data item.

4. The print control device according to claim 1,
wherein the at least one processor is configured to exclude the specific print data item from the plurality of print data items in response to an operation for excluding the specific print data item by an operator.

5. The print control device according to claim 4,
wherein, in a case where a period until a processing deadline of the specific print data item is shorter than a predetermined period, the the at least one processor is configured to not exclude the specific print data item from the $_p l_{ura} lit_y$ of print data items in response to the operation for excluding the specific print data item by the operator.

6. The print control device according to claim 5, wherein the at least one processor is configured to:
display information regarding a first print data item and information regarding a second print data item in a distinguished manner in a case where the first print data item is excluded and the second print data item is not excluded from the plurality of print data items.

7. The print control device according to claim 1, wherein the at least one processor is configured to:
acquire management data for managing the specific print data item, and
determine whether to exclude the specific print data item from the plurality of print data items based on exclusion availability information indicating whether to exclude the specific print data item that is included in the acquired management data.

8. The print control device according to claim 7,
wherein the at least one processor is configured to exclude the specific print data item from the plurality of print data items in a case where the exclusion availability information that is included in the acquired management data indicates that the specific print data item is to be excluded.

9. The print control device according to claim 7,
wherein the at least one processor is configured to exclude the specific print data item from the plurality of print data items in a case where the exclusion availability information is included in the acquired management data and the exclusion availability information indicates that the specific print data item is to be excluded, and
wherein the at least one processor is configured to determine whether to exclude the specific print data item from the plurality of print data items based on setting information stored in the print control device in a case where the exclusion availability information is not included in the acquired management data.

10. The print control device according to claim 1,
wherein the at least one processor is configured to exclude the specific print data item from the plurality of print data items in an exclusion mode selected from a first exclusion mode and a second exclusion mode.

11. The print control device according to claim 10,
wherein, in a case where the at least one processor is configured to exclude the specific print data item from the plurality of print data items in the first exclusion mode, the at least one processor is configured to not cancel exclusion of the specific print data item in a case where a period until a processing deadline of the specific print data item becomes shorter than a predetermined period.

12. The print control device according to claim 1, wherein the at least one processor is configured to:
store a cancellation time at which exclusion of the specific print data item from the plurality of print data items is to be cancelled, in association with the specific print data item, and
cancel the exclusion of the specific print data item from the plurality of print data items when the stored cancellation time is reached.

13. The print control device according to claim 12,
wherein the at least one processor is configured to store the cancellation time in association with the specific print data item when the specific print data item is excluded from the plurality of print data items in response to the plurality of print data items being extracted.

14. The print control device according to claim 12,
wherein the at least one processor is configured to store the cancellation time in association with the specific print data item when the specific print data is excluded from the plurality of print data items in response to an operation for excluding the specific print data item from the plurality of print data items b$_y$ an operator.

15. A non-transitory computer readable medium storing a program causing a computer to execute a process comprising:
extracting a plurality of print data items to be included in a print unit, the print unit being a unit of sequential printing by a printing device;
excluding a specific print data item among the plurality of print data items extracted, from the print unit; and
performing control such that the print unit from which the specific print data item is excluded is printed by the printing device;
wherein, in a case where a predetermined condition is satisfied after the specific print item data is excluded from the print unit the exclusion of the specificprint item data from the plurality of the print data is canceled.

* * * * *